(12) United States Patent
Yang et al.

(10) Patent No.: US 12,539,057 B2
(45) Date of Patent: Feb. 3, 2026

(54) METHOD FOR HEARING TEST AND HEARING TEST DEVICE

(71) Applicant: GN Hearing A/S, Ballerup (DK)

(72) Inventors: Qi Yang, Chicago, IL (US); Aalbert De Vries, Eindhoven (NL); Robyn Teresa Oliver, Highland Park, IL (US); Dorea R. Ruggles, Minneapolis, MN (US)

(73) Assignee: GN HEARING A/S, Ballerup (DK)

( * ) Notice: Subject to any disclaimer, the term of this patent is extended or adjusted under 35 U.S.C. 154(b) by 369 days.

(21) Appl. No.: 17/549,829

(22) Filed: Dec. 13, 2021

(65) Prior Publication Data

US 2023/0181062 A1    Jun. 15, 2023

(51) Int. Cl.
*A61B 5/12* (2006.01)
*H04R 25/00* (2006.01)

(52) U.S. Cl.
CPC .................................. *A61B 5/123* (2013.01)

(58) Field of Classification Search
None
See application file for complete search history.

(56) References Cited

U.S. PATENT DOCUMENTS

| | | | |
|---|---|---|---|
| 11,146,899 B2 | 10/2021 | De Vries et al. | |
| 2012/0051569 A1* | 3/2012 | Blamey | H04R 25/70 381/314 |
| 2015/0289786 A1* | 10/2015 | Garratt | A61B 5/7435 600/559 |
| 2016/0081595 A1* | 3/2016 | Hui | A61B 5/123 600/559 |
| 2017/0164124 A1* | 6/2017 | Shennib | A61B 5/123 |
| 2017/0273602 A1* | 9/2017 | Lasry | A61B 5/0022 |

(Continued)

FOREIGN PATENT DOCUMENTS

| | | | | |
|---|---|---|---|---|
| AU | 2010213370 A1 * | 10/2011 | ........... | H04R 25/305 |
| CA | 2384251 A1 * | 4/2001 | ............... | H04R 5/00 |

(Continued)

OTHER PUBLICATIONS

Extended European Search Report for EP Patent Appln. No. 22212482.8 dated May 9, 2023.

(Continued)

*Primary Examiner* — Qin Zhu
(74) *Attorney, Agent, or Firm* — Vista IP Law Group, LLP (57) ABSTRACT

An electronic device and a method for hearing test of a user is disclosed, the method comprising obtaining one or more first test parameters including a first primary test parameter; displaying a first user interface comprising a first primary user interface element according to the first primary test parameter; outputting a first primary test signal according to the first primary test parameter; while displaying the first user interface, detecting a first user input indicative of a request for change in the first primary test signal; determining a second primary test parameter according to the first user input indicative of a request for change in the first primary test signal; updating and displaying the first user interface according to the second primary test parameter; and outputting a second primary test signal according to the second primary test parameter.

20 Claims, 4 Drawing Sheets

(56) References Cited

U.S. PATENT DOCUMENTS

2020/0120434 A1     4/2020   Blamey et al.
2021/0321910 A1*   10/2021   Cabrera ............... A61B 5/7275
2022/0201404 A1*    6/2022   Xu ....................... H04R 25/305
2022/0369054 A1*   11/2022   Chung ................... H04R 25/70

FOREIGN PATENT DOCUMENTS

EP           3413585       12/2018
WO     WO-2007052189 A2 *   5/2007   ............ H04R 25/30
WO     WO-2018087566 A1 *   5/2018   ............ A61B 5/121

OTHER PUBLICATIONS

Examination Report for EP Patent Appln. No. 22212482.8 dated May 9, 2025.

* cited by examiner

METHOD FOR HEARING TEST AND HEARING TEST DEVICE

FIELD

The present disclosure relates to hearing tests including a hearing test device and methods for hearing test. In particular, methods for user-performed hearing test are disclosed.

BACKGROUND

When hearing device users are provided with a hearing device, the gain parameters and other hearing device parameters of the hearing device needs to be configured according to a user's hearing loss. Hearing loss is usually determined at a doctor, a dispenser, or audiologist, e.g. at a hearing clinic. The hearing device is then configured according to the determined hearing loss. Hearing test is usually a cumbersome and time-consuming process requiring the presence of the user at the hearing clinic.

SUMMARY

There is a need for methods and electronic devices, which provides an easier and more intuitive way of hearing tests.

Methods and devices, in particular methods and devices for hearing test, are provided.

A method for hearing test of a user is disclosed, the method comprising obtaining one or more first test parameters including a first primary test parameter; displaying a first user interface comprising a first primary user interface element according to the first primary test parameter, e.g. on a display of an electronic device; outputting a first primary test signal according to the first primary test parameter; while displaying the first user interface, detecting a first user input indicative of a request for change in the first primary test signal; determining a second primary test parameter according to the first user input indicative of a request for change in the first primary test signal; updating and displaying the first user interface, e.g. according to the second primary test parameter and/or according to the first user input; and outputting a second primary test signal according to the second primary test parameter.

An electronic device, e.g. for hearing test, is disclosed, the electronic device comprising a display, an interface, and a processor, wherein the processor is configured to: obtain one or more first test parameters including a first primary test parameter; display, e.g. on the display, a first user interface comprising a first primary user interface element according to the first primary test parameter; output, e.g. via the interface, a first primary test signal according to the first primary test parameter; detect a first user input indicative of a request for change in the first primary test signal, while displaying the first user interface; determine a second primary test parameter according to the first user input; update and display the first user interface according to the second primary test parameter; and outputting, e.g. via the interface, a second primary test signal according to the second primary test parameter.

Further, a computer readable storage medium storing one or more programs is disclosed, the one or more programs comprising instructions, which when executed by an electronic device with an interface, a memory and a processor cause the electronic device to perform any one of the methods described herein.

It is an important advantage that more precise and accurate hearing loss parameters are obtained. Thus, an improved hearing test is provided for and in particular improved self-testing of hearing loss or other aspects related to hearing are disclosed.

Further, the present disclosure allows effective hearing device setup or configuration without involving a dispenser or audiologist in clinically determining hearing loss/audiogram. The present hearing systems, devices and methods provide improved and clear feedback to a user during a hearing test.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A method, such as a method for hearing test of a user, is disclosed. The method may be a computer-implemented method and is optionally performed in an electronic device, such as a smartphone, a smartwatch, or a tablet computer.

The method comprises obtaining one or more first test parameters including a first primary test parameter. The first primary test parameter also denoted PTP_1 may be a gain in a primary frequency band with a primary center frequency. The first test parameters may be default parameters retrieved from memory of the electronic device and/or received from an external device, such as a server.

The method optionally comprises determining a first user interface based on the first primary test parameter. The first user interface may comprise a user input control, such as a slider control having a maximum and a minimum. The user input control may comprise or be embodied as a wheel control. The first user interface may comprise an increase user interface element and/or a decrease user interface element for allowing user input indicative of desired increase and/or decrease in the primary test parameter.

The method comprises displaying, e.g. on a display of the electronic device, a first user interface comprising a first primary user interface element according to the first primary test parameter.

The first user interface optionally comprises a first primary user interface element with a first primary position on the first user interface, such as a first primary position on a slider control between a minimum and a maximum. The first primary position on the first user interface is based on the first primary test parameter. In other words, the first primary test parameter is mapped to a first primary position on the first user interface.

Further, the method comprises outputting, e.g. via an interface of the electronic device, a first primary test signal according to the first primary test parameter. Outputting a first primary test signal may comprise wired or wirelessly transmitting the first primary test signal and/or one or more first primary control parameters indicative of the first primary test signal, e.g. to a hearing device and/or a headset. Thereby, the first primary test signal can be played to one or both ears of the user allowing the user to evaluate the first primary test signal.

The method comprises, while displaying the first user interface, detecting a first user input indicative of a request for change in the first primary test signal. The first user input may be activation (single or multiple button presses) of a first button on the electronic device indicative of a desired increase in the (first) primary test parameter. The first user input may be activation of a second button (single or multiple button presses) on the electronic device indicative of a desired decrease in the (first) primary test parameter. The first user input may be a touch and slide, optionally followed by lift-off, of the first primary user interface element on the display being a touch-sensitive display. In other words, the user may move the first primary user interface element to a second primary position being a lift-off position. The first user input may be a tapping on the user input control, the position of the tap being indicative of a desired primary test parameter. The first input may be indicative of a volume increase of the first primary test signal. The first input may be indicative of a volume decrease of the first primary test signal. The first input may be indicative of a frequency increase of the first primary test signal. The first input may be indicative of a frequency decrease of the first primary test signal.

The method optionally comprises determining a second primary test parameter, e.g. according to or based on the first user input indicative of a request for change in the first primary test signal. For example, the second primary test parameter may be determined based on the second primary position (lift-off of first user input) of the first primary user interface element or tap position of first user input. For example, the second primary test parameter may be determined based on the number of button-presses (first button and/or second button) in the first user input.

The method comprises updating and displaying the first user interface, e.g. according to the second primary test parameter and/or the first user input, and optionally outputting a second primary test signal according to the second primary test parameter. The updated first user interface e.g. according to the second primary test parameter and/or the first user input optionally comprises the first primary user interface element with a second primary position on the first user interface, such as a second primary position on a slider control between a minimum and a maximum. The second primary position on the first user interface is based on the second primary test parameter. In other words, the second primary test parameter is mapped to a second primary position on the first user interface.

In the method, updating and displaying the first user interface may comprise updating one or more parameters of a user input control based on the second primary test parameter and/or the first user input, such as updating a minimum and/or a maximum of the slider control based on the second primary test parameter and/or the first user input. In other words, the resolution of the slider control may be increased based on the based on the second primary test parameter and/or the first user input. Further, the sensitivity of user input detection, such as delta gain per button-press and/or delta gain per cm on the touch-sensitive display, may be increased and/or decreased. In other words, updating and displaying the first user interface may comprise updating, such as increasing or decreasing, a resolution of the slider control and/or updating, such as increasing or decreasing, a sensitivity of user input detection. Thereby, faster and more accurate/precise user-setting of the test parameters may be provided for.

In one or more exemplary methods, the method comprises, while displaying the first user interface, detecting a second user input indicative of a request for change in the second primary test signal, such as a change in volume and/or frequency in the second primary test signal. The second user input may be activation (single or multiple button presses) of a first button on the electronic device indicative of a desired increase in the (second) primary test parameter. The second user input may be activation of a second button (single or multiple button presses) on the electronic device indicative of a desired decrease in the (second) primary test parameter. The second user input may be a touch and slide, optionally followed by lift-off, of the first primary user interface element on the display being a touch-sensitive display. In other words, the user may move the first primary user interface element to a third primary position being a lift-off position. The second user input may be a tapping on the user input control, the position of the tap being indicative of a desired primary test parameter.

The method optionally comprises determining a third primary test parameter according to the second user input; updating and displaying the first user interface according to the third primary test parameter; and outputting a third primary test signal according to the third primary test parameter. For example, the third primary test parameter may be determined based on the third primary position (lift-off of second user input) of the first primary user interface element or tap position of second user input. For example, the third primary test parameter may be determined based on the number of button-presses (first button and/or second button) in the second user input.

In one or more exemplary methods, the first user interface comprises a slider control. The first primary user interface element may be moved along a slider axis between a minimum and a maximum. Updating the first user interface may comprise updating the minimum and/or the maximum based on the user input. For example, updating the minimum and/or the maximum based on the user input may comprise reducing the maximum if the user input is indicative of a desired decrease in the (primary) test parameter. In one or more exemplary method, updating the minimum and/or the maximum based on the user input may comprise increasing the minimum if the user input is indicative of a desired increase in the (primary) test parameter.

In one or more exemplary methods, the method comprises, while displaying the first user interface, detecting a user input indicative of acceptance of a primary test signal, such as the first primary test signal, the second primary test signal, or the third primary test signal. Detecting a user input indicative of acceptance of a primary test signal may comprise detecting a tap on a first-accept-input user interface element and/or detecting a double-tap on the first primary user interface element.

The method may comprise, in accordance with detecting a user input indicative of acceptance of the primary test signal, determining and/or outputting a primary operating parameter of a hearing device based on a primary test parameter associated with the accepted primary test signal. For example, in case the user accepts the second primary test signal, determining and/or outputting a primary operating parameter is optionally based on the second primary test parameter.

In one or more exemplary methods, outputting a primary operating parameter of a hearing device comprises transmitting the primary operating parameter to a hearing device, e.g. via the interface of the electronic device. The primary operating parameter may be a hearing loss parameter of an audiogram, such as a gain. Outputting a primary operating parameter of a hearing device may comprise storing the primary operating parameter in a memory of the electronic. In one or more exemplary methods, outputting a primary operating parameter of a hearing device comprises transmitting the primary operating parameter to a server device.

In one or more exemplary methods, the method comprises transmitting one or more accepted test parameters to a server device and/or to a hearing device.

In one or more exemplary methods, detecting a user input indicative of acceptance of a primary test signal comprises detecting a first user-accept input indicative of a first acceptance of a primary test signal associated with a first user-accept primary test parameter, e.g. by detecting a tap on a first-accept-input user interface element of the first user interface. In one or more exemplary methods, the first user-accept input is indicative of a situation, where the user can barely hear the outputted primary test signal. The first user-accept primary test parameter corresponds to the primary test parameter that formed basis for the accepted primary test signal (first user-accept input). In other words, if a user accepts the second primary test signal (first user-accept input), the second primary test parameter is the first user-accept primary test parameter. In one or more exemplary methods, the method may, in accordance with detecting a first user-accept input indicative of a first acceptance of a primary test signal associated with a first user-accept primary test parameter, determine and set the next primary test parameter to a value less than the first user-accept primary test parameter PTP_accept_1 e.g. by reducing the first user-accept primary test parameter with a default value, such as by subtraction of the default value or multiplication with the default value less than 1. For example, the next PTP_m+1 may be given as:

PTP_$m$+1=PTP_accept_1−PTP_red or PTP_$m$+1=PTP_accept_1*PTP_red.

where PTP_red is a reduction parameter, e.g. larger than 2 dB in the subtraction case and e.g. less than 0.95 in the multiplication case.

In one or more exemplary methods, determining a primary operating parameter of a hearing device based on a primary test parameter associated with the accepted primary test signal is based on the first user-accept primary test parameter.

In one or more exemplary methods, the method comprises determining a first-accept user interface element based on the first user-accept primary test parameter and optionally displaying the first-accept user interface element on the first user interface.

In one or more exemplary methods, detecting a user input indicative of acceptance of a primary test signal comprises detecting a second user-accept input indicative of a second acceptance of a primary test signal associated with a second user-accept primary test parameter, such as a gain of inaudible primary test signal, e.g. by detecting a tap on a second-accept-input user interface element of the first user interface. In one or more exemplary methods, the second user-accept input is indicative of a situation, where the user cannot hear the primary test signal being output, such as a situation where the user cannot hear the primary test signal being output but can if the primary test parameter is increased. The second user-accept primary test parameter corresponds to the primary test parameter that formed basis for the accepted primary test signal (second user-accept input). In other words, if a user accepts the third primary test signal (second user-accept input), the third primary test parameter is the second user-accept primary test parameter.

In one or more exemplary methods, the method comprises, in accordance with detecting a second user-accept input, determining and outputting a primary operating parameter, such as a primary gain for a primary frequency/primary frequency range of a hearing device based on the first user-accept primary test parameter, such as a gain of inaudible primary test signal, and/or the second user-accept primary test parameter, such as a gain of inaudible primary test signal.

In one or more exemplary methods, determining a primary operating parameter of a hearing device based on a primary test parameter associated with the accepted primary test signal is based on the second user-accept primary test parameter. Basing the primary operating parameter on two user-accepted primary test parameters increases the accuracy in evaluating the hearing loss of the user which in turn leads to a more precise hearing test.

In one or more exemplary methods, the method comprises determining a second-accept user interface element based on the second user-accept primary test parameter and displaying the second-accept user interface element on the first user interface.

In one or more exemplary methods, the first primary test parameter is a gain selected in the audible range of a user.

In one or more exemplary methods, the act of obtaining one or more first test parameters including a first primary test parameter comprises obtaining a first secondary test parameter, e.g. associated with a secondary frequency or secondary frequency band. The method optionally comprises determining and/or displaying a second user interface comprising a first secondary user interface element according to the first secondary test parameter and outputting a first secondary test signal according to the first secondary test parameter, e.g. in accordance with detecting a first user-accept input or a second user-accept input indicative of acceptance of the primary test signal.

The method may comprise determining N operating parameters of a hearing device, each operating parameter corresponding to a frequency band of a plurality of frequency bands by repeating the method with primary test signal(s) (TS_n_1, TS_n_2, . . . , TS_n_i for n=1), secondary test signal(s) (TS_n_1, TS_n_2, TS_n_i for n=2), tertiary test signal(s) (TS_n_1, TS_n_2, . . . , TS_n_i) until an operating parameter OP_n is determined for each of the N frequency bands, i.e. for n=1, 2, . . . , N. The index i is a running index increased for every user input indicative of a request for change in the associated test signal TS_n_i, such as an increase or decrease in volume and/or frequency of associated test signal TS_n_i The index i is reset when a test parameter has been approved. N may be in the range from 1 to 50, such as 2 or in the range from 3 to 25.

The method optionally comprises, while displaying the second user interface, detecting a first user input indicative of a request for change in the first secondary test signal, such as volume and/or frequency of the first secondary test signal; determining a second secondary test parameter according to the first user input indicative of a request for change in the first secondary test signal; and updating and displaying the second user interface according to the second secondary test parameter. The method optionally comprises outputting a second secondary test signal according to the second secondary test parameter.

Further, an electronic device is disclosed, the electronic device comprising a display, an interface, and a processor. The electronic device may be a smartphone, a smartwatch or a tablet computer. The electronic device may be configured to perform any of the methods as disclosed herein. The interface may comprise one or more buttons, such as a first button and/or a second button. The interface may comprise a touch-sensitive display. In other words, the display may be a touch-sensitive display for displaying user interfaces and receiving user input.

The processor is optionally configured to obtain one or more first test parameters including a first primary test parameter; determine and/or display a first user interface comprising a first primary user interface element according to the first primary test parameter; output, such as stream and/or transmit to a hearing device, a first primary test signal according to the first primary test parameter; detect a first user input indicative of a request for change in the first primary test signal, such a volume and/or frequency of the first primary test signal, while displaying the first user interface; determine a second primary test parameter according to the first user input; update and display the first user interface according to the second primary test parameter; and outputting, such as stream and/or transmit to a hearing device, a second primary test signal according to the second primary test parameter.

Further, a hearing device is disclosed. The hearing device may be a hearable or a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid. The hearing device may comprise a first earpiece and a second earpiece, wherein the first earpiece and/or the second earpiece is an earpiece as disclosed herein.

The hearing device may be configured for wireless communication with one or more devices, such as with another hearing device, e.g. as part of a binaural hearing system, and/or with one or more electronic devices as disclosed herein, such as a smartphone, a tablet and/or a smart watch. The hearing device optionally comprises an antenna for converting one or more wireless input signals, e.g. one or more test signals from an electronic device, such as first primary test signal, second primary test signal, and optionally third primary test signal, to antenna output signal(s). The wireless input signal(s) may origin from external source(s), such as spouse microphone device(s), wireless TV audio transmitter, and/or a distributed microphone array associated with a wireless transmitter. The wireless input signal(s) may origin from another hearing device, e.g. as part of a binaural hearing system, and/or from one or more electronic devices as disclosed herein.

The hearing device optionally comprises a radio transceiver coupled to the antenna for converting the antenna output signal to a transceiver input signal. Wireless signals from different external sources may be multiplexed in the radio transceiver to a transceiver input signal or provided as separate transceiver input signals on separate transceiver output terminals of the radio transceiver. The hearing device may comprise a plurality of antennas and/or an antenna may be configured to be operate in one or a plurality of antenna modes. The transceiver input signal optionally comprises a first transceiver input signal representative of the first wireless signal from a first external source.

The hearing device comprises a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals, such as pre-processed transceiver input signal(s) and/or pre-processed microphone input signal(s). The processor is optionally configured to compensate for hearing loss of a user of the hearing device, e.g. based on one or more operating parameters, such as primary operating parameter and optionally further operating parameters stored in memory of the hearing device. The processor provides an electrical output signal based on the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

The hearing device comprises a receiver for converting the electrical output signal to an audio output signal. The hearing device comprises a receiver for converting the electrical output signal to an audio signal The hearing device may be configured to wirelessly receive, via the radio transceiver, the primary test signal(s) and/or one or more primary control parameters indicative of the primary test signal(s) from the electronic device. The one or more primary control parameters may comprise the primary test parameter. The one or more primary control parameters may comprise a primary test signal identifier, such as a primary frequency of the primary test signal. The processor of the hearing device is configured to output the electrical output signal based on the primary test signal and/or one or more primary control parameters indicative of the primary test signal(s). The hearing device may be configured to wirelessly receive operating parameter(s) from the electronic device, e.g. via a direct connection between the hearing device and/or via a server device. The hearing device is configured to store the operating parameter(s) and apply the operating parameters in processing of input signals in the processor.

Figure 1:
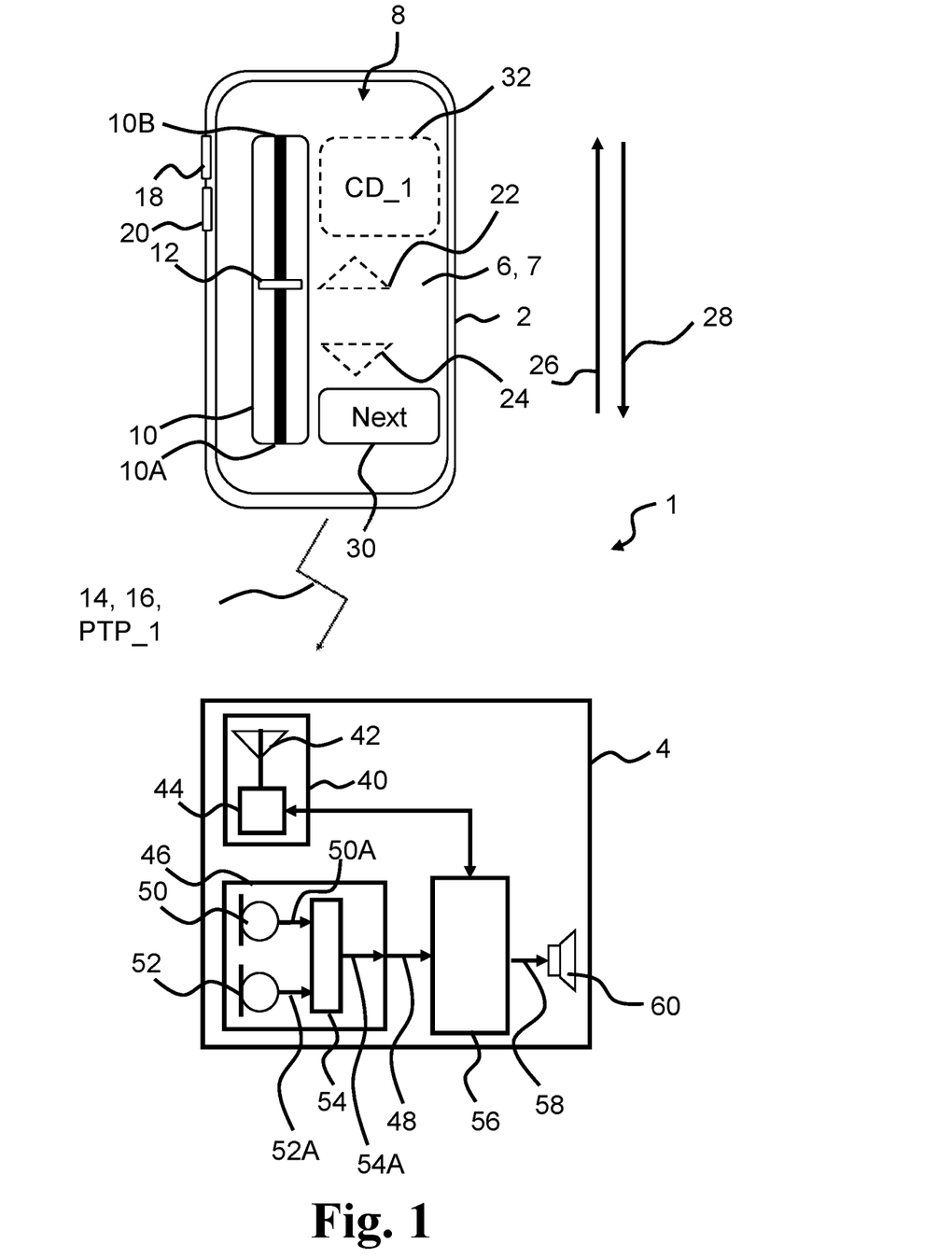
FIG. 1 schematically illustrates an exemplary hearing test setup.

FIG. 1 shows an exemplary hearing test setup 1 comprising an electronic device 2 and a hearing device 4. The electronic device 2 as illustrated is a smartphone, however the electronic device 2 may also be implemented, e.g. as a tablet computer.

The electronic device 2 comprises a display 6 comprising a touch-sensitive display 7, an interface and a processor (not shown). The processor is configured to obtain one or more first test parameters including a first primary test parameter, e.g. from a memory of the electronic device. The processor is configured to display, on the display 6, a first user interface 8 comprising a slider control 10 with a first primary user interface element 12 according to the first primary test parameter PTP_1 and output a first primary test signal 14 according to the first primary test parameter PTP_1 e.g. by streaming the first primary test signal 14 to the hearing device 4 and/or transmitting one or more first primary control parameters 16, e.g. including the first primary test parameter PTP_1, indicative of the first primary test signal 14 from the electronic device. The processor of the electronic device 2 is configured to detect a first user input indicative of a request for change in the first primary test signal 14, while displaying the first user interface 8.

The first primary user interface element 12 is arranged in a first primary position P_1_1 on the slider control 10 between a minimum 10A and a maximum 10B of the control slider 10. The first primary position P_1_1 of the first primary user interface element 12 on the first user interface 8 is based on and indicative of the first primary test parameter. In other words, the first primary test parameter PTP_1 is mapped to a first primary position P_1_1 on the first user interface 8.

The interface of the electronic device 2 optionally comprises a first button 18 and/or a second button 20, e.g. on a side of the electronic device 2. The touch-sensitive display 7 forms a part of the first user interface 8 of the electronic device. The first user input indicative of a request for change in the first primary test signal may comprise one or more button-presses on the first button indicative of a request for increase in the first primary test signal volume. The first user input indicative of a request for change in the first primary test signal may comprise one or more button-presses on the second button indicative of a request for decrease in the first primary test signal volume.

The first user interface 8 may comprise an increase user interface element 22 for receiving a first user input indicative of a request for increase in the first primary test signal volume by the user tapping the increase user interface element 22. The first user interface 8 may comprise a decrease user interface element 24 for receiving a first user input indicative of a request for decrease in the first primary test signal volume by the user tapping the decrease user interface element 24.

The first user input indicative of a request for change in the first primary test signal may comprise a user swipe on the slider control 10, where an up-swipe (i.e. in increase-direction 26) on the slider control 10, such as on the first primary user interface element 12, corresponds to and is detected as a first user input indicative of a request for increase in the first primary test signal volume.

The first user input indicative of a request for change in the first primary test signal may comprise a user swipe on the slider control 10, where a down-swipe (i.e. in decrease-direction 28) on the slider control corresponds to and is detected as a first user input indicative of a request for decrease in the first primary test signal volume.

The processor of the electronic device 2 is configured to determine a second primary test parameter PTP_2 according to the first user input. The second primary test parameter may be based on the first primary test parameter PTP_1 and a change parameter based on the first user input. For example, the second primary test parameter PTP_2 may be given as:

$$PTP\_2 = PTP\_1 + CP\_1,$$

where PTP_1 is the first primary test parameter and CP_1 is a first change parameter based on the first user input. The first change parameter CP_1 may be less than zero if the first user input is indicative of a request for decrease in the first primary test signal, e.g. by a down-swipe on control slider 10, one or more button-presses of second button 20, or tap(s) on the decrease user interface element 24.

The first change parameter CP_1 may be larger than zero if the first user input is indicative of a request for increase in the first primary test signal, e.g. by an up-swipe on control slider 10, one or more button-presses of first button 18, or tap(s) on the increase user interface element 22.

Figure 2:
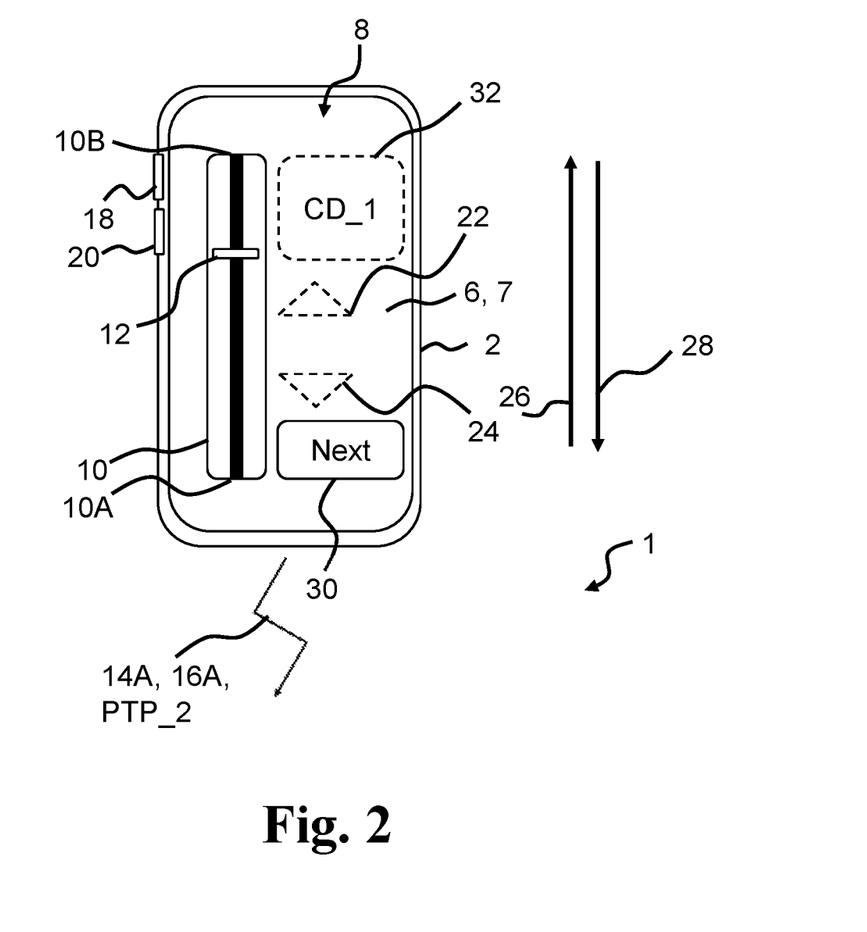
FIG. 2 schematically illustrates an electronic device of an exemplary hearing test setup.

The processor of the electronic device 2 is configured to update and display the first user interface according to the second primary test parameter and output a second primary test signal according to the second primary test parameter, which is described in further detail of FIG. 2.

The first user interface 8 comprises a first-accept-input user interface element 30 for receiving a first user-accept input indicative of a first acceptance of the primary test signal associated with the primary test parameter currently used (at this stage the first primary test signal/first primary test parameter). The processor is configured to detect a user input indicative of acceptance of a primary test signal by detecting a tap on the first-accept-input user interface element 30 of the first user interface 8. The first user-accept input is optionally indicative of a situation, where the user can barely hear the primary test signal being output.

The first user interface 8 optionally comprises, e.g. while the first-accept-input user interface element 30 is displayed, a first context user interface element 32 comprising first context data CD_1. The first context data CD_1 may comprise an instruction to the user for carrying out the hearing test and/or setting the first primary user interface element. For example, the first context data may be "Adjust volume or loudness of test signal such that you can barely hear it. Tap Next when you are done.".

The hearing device 4 comprises a transceiver module 40 for (wireless) communication with the electronic device 2. The transceiver module 40 comprises antenna 42 and transceiver 44, and is configured for receipt and/or transmission of wireless signals from the electronic device 2. The hearing device 4 optionally comprises an input module 46 for providing a first input signal 48, the input module 46 comprising a first microphone 50 and a second microphone 52 for providing a first microphone input signal 50A and a second microphone input signal 52A, respectively. The input module 46 optionally comprises a beamforming module 54 connected to the first microphone 50 and the second microphone 52 for receiving and processing the first microphone input signal 50A and the second microphone input signal 52A. The beamforming module 54 provides or outputs a beamform signal 54A based on the first microphone input signal 50A and the second microphone input signal 52A. The hearing device comprises a processor 56 and the beamform signal 54A is fed to the processor 56 as the first input signal 48. The processor 56 processes the first input signal 48 according to one or more operating parameters and provides an electrical output signal 58 based on the first input signal 48. The hearing device 4 comprises a receiver 60 for converting an output signal based on the electrical output signal 58 to an audio output signal, i.e. for providing an audio output signal. The hearing device 4 is configured to receive the first primary test signal 14 and/or one or more first primary control parameters 16, e.g. including the first primary test parameter PTP_1, indicative of the first primary test signal 14 from the electronic device. The hearing device 4 is configured to output an audio output signal corresponding to the first primary test signal in response to receiving the first primary test signal 14 and/or one or more first primary control parameters 16, e.g. including the first primary test parameter PTP_1.

FIG. 2 illustrates the first user interface 8 after update and display of the first user interface 8 according to the second primary test parameter PTP_2 in accordance with the first user input. The first user input was indicative of a request for increase in the first primary test signal. Increase in the first primary test signal is performed by changing the position of user interface element 12 from first primary position P_1_1 to first secondary position P_1_2 on the slider control 10 in the increase direction 26 (such as up-swiping). In one or more examples, the increase in the first primary test signal may be performed by one or more taps on the increase user interface element 22 on the first user interface 8. In one or more examples, the increase in the first primary test signal may be performed by one or more button-presses of first button 18. In accordance with the first secondary position of the user interface element, the processor of the electronic device determines the first change parameter CP_1. The first change parameter may be larger than zero as the first user input is indicative of a request for increase in the first primary test signal. Further, the processor of electronic device 2 determines a new test parameter (a second primary test parameter, PTP_2). The second primary test parameter, PTP_2, is determined based on PTP_1 and CP_1 (such as PTP_2=PTP_1+CP_1). In this case, PTP_2 is greater than PTP_1. Based on the PTP_2, the processor of the electronic device 2 is configured to determine second primary test signal.

The processor of the electronic device 2 is configured to update and display the first user interface according to the second primary test parameter and output a second primary test signal 14A according to the second primary test parameter PTP_2. In one or more examples, outputting PTP_2 is streaming to hearing device 4. The streaming may include transmitting one or more second primary control parameters 16A. The hearing device 4 (shown in FIG. 1) is configured to receive the second primary test signal and output the increased volume via receiver 60 (shown in FIG. 1).

Figure 3:
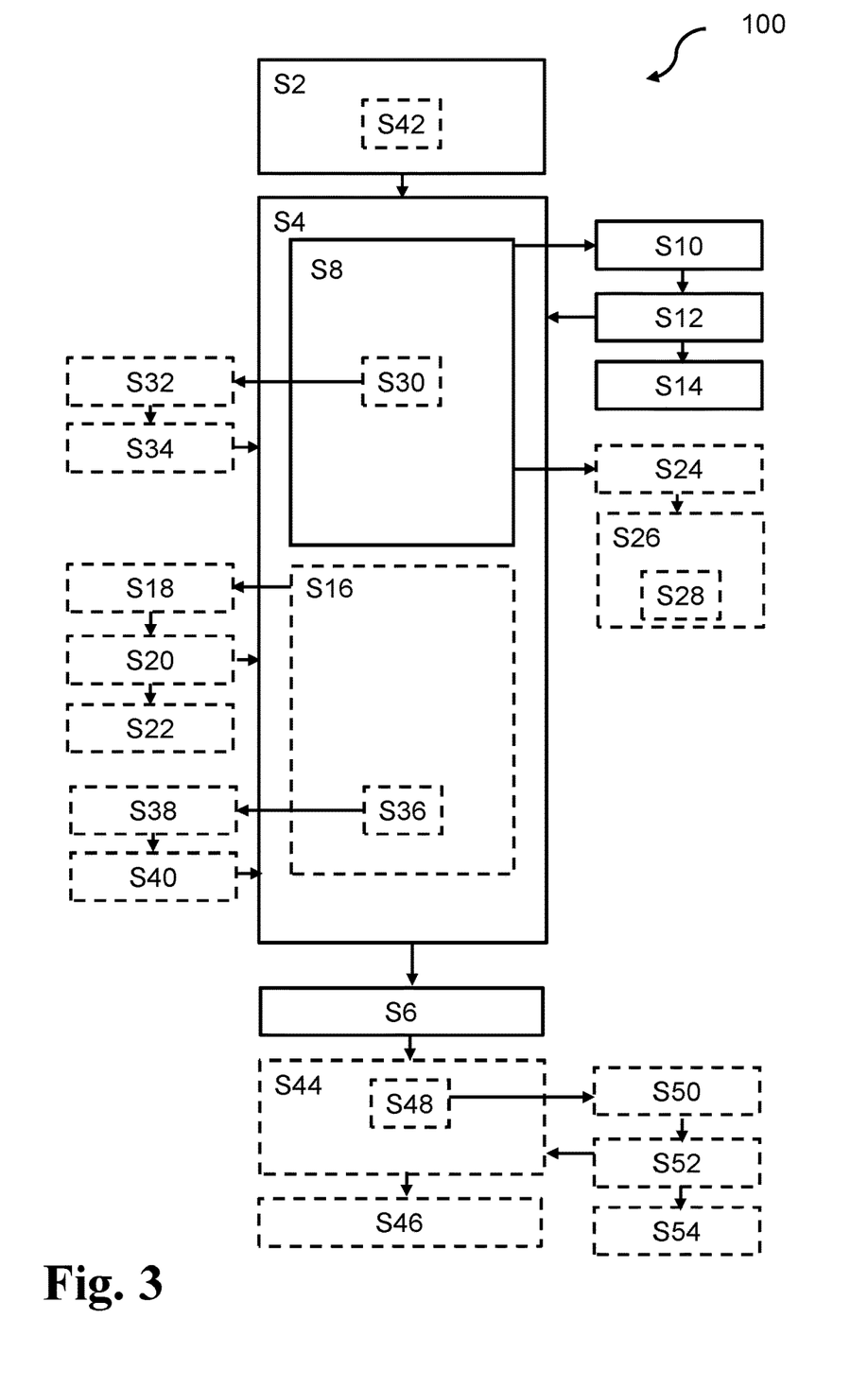
FIG. 3 is a flow diagram of an exemplary method according to the disclosure.

FIG. 3 is a flow chart of an exemplary method 100 according to the present disclosure. The method 100 is a method for hearing test of a user and comprises obtaining S2 one or more first test parameters including a first primary test parameter; displaying S4 a first user interface comprising a first primary user interface element according to the first primary test parameter; outputting S6 a first primary test signal according to the first primary test parameter; and while displaying S4 the first user interface, detecting S8 a first user input indicative of a request for change in the first primary test signal.

In one or more exemplary methods, a request for change in the first primary test signal may be indicative of increase or decrease in volume and/or frequency of the first primary test signal. The request for change may be obtained via first button, second button, a virtual slider, increase user interface element, or decrease user interface element of electronic device.

The method 100 comprises determining S10 a second primary test parameter according to the first user input indicative of a request for change in the first primary test signal.

In other words, the second primary test parameter is determined based on increase or decrease in the volume and/or frequency of the first primary test signal.

The method 100 comprises updating and displaying S12 the first user interface according to the second primary test parameter.

The method 100 comprises outputting S14 a second primary test signal according to the second primary test parameter.

In one more exemplary methods, the method 100 comprises, while displaying S4 the first user interface, detecting S16 a second user input indicative of a request for change in the second primary test signal. In one or more exemplary methods, a request for change in the second primary test signal may be indicative of increase or decrease in volume and/or frequency.

In one more exemplary methods, the method 100 comprises determining S18 a third primary test parameter according to the second user input and updating and displaying S20 the first user interface according to the third primary test parameter. In one more exemplary methods, the method comprise outputting S22 a third primary test signal according to the third primary test parameter.

In one more exemplary methods, the method 100 comprises while displaying S4 the first user interface, detecting S24 a user input indicative of acceptance of a primary test signal, such as the first primary test signal or the second primary test signal, and in accordance with detecting a user input indicative of acceptance of the primary test signal, determining and outputting S26 a primary operating parameter of a hearing device based on a primary test parameter associated with the accepted primary test signal. The primary operating parameter is optionally indicative of primary gain for a primary frequency and/or gain for a primary frequency range.

In one more exemplary methods, outputting S26 a primary operating parameter of a hearing device comprises transmitting S28 the primary operating parameter to a hearing device.

In one more exemplary methods, detecting a user input indicative of acceptance of a primary test signal, comprises detecting S30 a first user-accept input indicative of a first acceptance of a primary test signal associated with a first user-accept primary test parameter.

In one or more exemplary methods, detecting S30 a first user-accept input is associated with a user tapping a first user-accept user interface element of the first user interface.

In one more exemplary methods, determining a primary operating parameter of a hearing device based on a primary test parameter associated with the accepted primary test signal is based on the first user-accept primary test parameter.

In one more exemplary methods, the method comprises determining S32 a first-accept user interface element based on the first user-accept primary test parameter and displaying S34 the first-accept user interface element on the first user interface.

In one more exemplary methods, detecting S16 a user input indicative of acceptance of a primary test signal comprises detecting S36 a second user-accept input indicative of a second acceptance of a primary test signal associated with a second user-accept primary test parameter. In one or more exemplary methods, detecting S30 a first user-accept input is associated with a user tapping a second user-accept user interface element of the first user interface when the primary test signal is inaudible or when user wants to change voluntarily.

In one more exemplary methods, determining a primary operating parameter of a hearing device based on a primary test parameter associated with the accepted primary test signal is based on the second user-accept primary test parameter.

In one more exemplary methods, the method comprises, determining S38 a second-accept user interface element based on the second user-accept primary test parameter and displaying S40 the second-accept user interface element on the first user interface.

In one more exemplary methods, the first primary test parameter is a gain selected in the audible range of a user.

In one more exemplary methods, the act of obtaining S2 one or more first test parameters including a first primary test parameter comprises obtaining S42 a first secondary test parameter.

In one more exemplary methods, the method 100 comprises displaying S44 a second user interface comprising a first secondary user interface element according to the first secondary test parameter and outputting S46 a first secondary test signal according to the first secondary test parameter.

In one more exemplary methods, the method 100 comprises while displaying S44 the second user interface, detecting S48 a first user input indicative of a request for change in the first secondary test signal.

In one more exemplary methods, the method 100 comprises determining S50 a second secondary test parameter according to the first user input indicative of a request for change in the first secondary test signal.

In one more exemplary methods, the method 100 comprises updating and displaying S52 the second user interface according to the second secondary test parameter and outputting S54 a second secondary test signal according to the second secondary test parameter.

Figure 4:
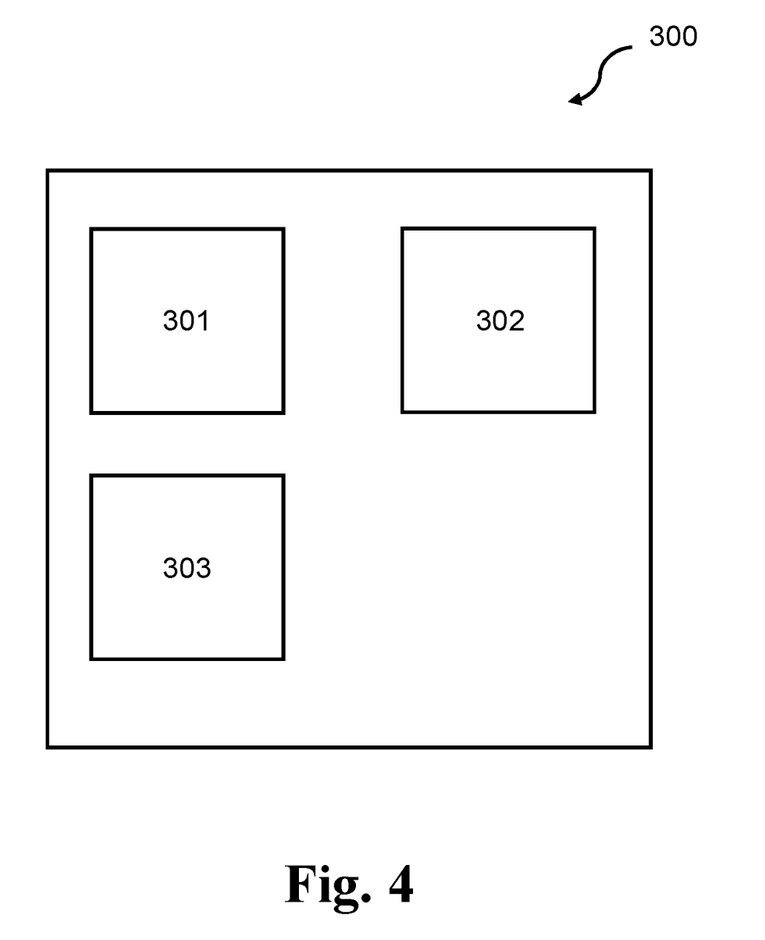
FIG. 4 is a block diagram of an exemplary electronic device.

FIG. 4 shows a block diagram of an example electronic device 300 according to the disclosure. The electronic device 300 comprises a display 301, processor 302, and a interface 303. The electronic device may comprise a memory circuitry 304 and a wireless interface 305. The electronic device 300 may be configured to perform any of the methods disclosed herein. In other words, the electronic device 300 may be configured to obtain (such as via the interface 303 and memory circuitry 304) one or more first test parameters including a first primary test parameter. The electronic device 300 may be configured to display (such as using the processor 302 and interface 301) a first user interface comprising a first primary user interface element according to the first primary test parameter.

The electronic device 300 may be configured to output (such as using the processor 302 and interface 301) a first primary test signal according to the first primary test parameter. The electronic device 300 may be configured to detect a first user input indicative of a request for change in the first primary test signal.

The electronic device 300 may be configured to, while displaying the first user interface, determine a second primary test parameter according to the first user input.

The electronic device 300 may be configured to update and display (such as using the processor 302, interface 301 and display 301) the first user interface according to the second primary test parameter. The electronic device 300 may be configured to output a second primary test signal according to the second primary test parameter.

The electronic device 300 is optionally configured to perform any of the operations disclosed in FIG. 4 (such as any one or more of S2-S54). The operations of the electronic device 300 may be embodied in the form of executable logic routines (for example, lines of code, software programs, etc.) that are stored on a non-transitory computer readable medium (for example, memory circuitry 301) and are executed by processor 302).

Furthermore, the operations of the electronic device 300 may be considered a method that the electronic device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor 302. Memory circuitry 301 may exchange data with processor 302 over a data bus. Control lines and an address bus between memory circuitry 301 and processor 302 also may be present (not shown in FIG. 4). Memory circuitry 301 is considered a non-transitory computer readable medium.

Memory circuitry 301 may be configured to store information, such as one or more programs comprising instructions, test parameters, and operating parameters in a part of the memory.

Examples of methods and products, such as electronic devices, according to the disclosure are set out in the following items:

Item 1. A method for hearing test of a user, the method comprising
    obtaining one or more first test parameters including a first primary test parameter;
    displaying a first user interface comprising a first primary user interface element according to the first primary test parameter;
    outputting a first primary test signal according to the first primary test parameter;
    while displaying the first user interface, detecting a first user input indicative of a request for change in the first primary test signal;
    determining a second primary test parameter according to the first user input indicative of a request for change in the first primary test signal;
    updating and displaying the first user interface according to the second primary test parameter; and
    outputting a second primary test signal according to the second primary test parameter.

Item 2. Method according to claim 1, wherein the method comprises:
    while displaying the first user interface, detecting a second user input indicative of a request for change in the second primary test signal;
    determining a third primary test parameter according to the second user input;
    updating and displaying the first user interface according to the third primary test parameter; and
    outputting a third primary test signal according to the third primary test parameter.

Item 3. Method according to any of items 1-2, wherein the first user interface comprises a slider control.

Item 4. Method according to any of items 1-3, wherein the method comprises: while displaying the first user interface, detecting a user input indicative of acceptance of a primary test signal; and in accordance with detecting a user input indicative of acceptance of the primary test signal, determining and outputting a primary operating parameter of a hearing device based on a primary test parameter associated with the accepted primary test signal.

Item 5. Method according to item 4, wherein outputting a primary operating parameter of a hearing device comprises transmitting the primary operating parameter to a hearing device.

Item 6. Method according to any of items 4-5, wherein detecting a user input indicative of acceptance of a primary test signal comprises detecting a first user-accept input indicative of a first acceptance of a primary test signal associated with a first user-accept primary test parameter.

Item 7. Method according to item 6, wherein determining a primary operating parameter of a hearing device based on a primary test parameter associated with the accepted primary test signal is based on the first user-accept primary test parameter.

Item 8. Method according to any of items 6-7, the method comprising determining a first-accept user interface element based on the first user-accept primary test parameter and displaying the first-accept user interface element on the first user interface.

Item 9. Method according to any of items 4-8, wherein detecting a user input indicative of acceptance of a primary test signal comprises detecting a second user-accept input indicative of a second acceptance of a primary test signal associated with a second user-accept primary test parameter.

Item 10. Method according to item 9, wherein determining a primary operating parameter of a hearing device based on a primary test parameter associated with the accepted primary test signal is based on the second user-accept primary test parameter.

Item 11. Method according to any of items 9-10, the method comprising determining a second-accept user interface element based on the second user-accept primary test parameter and displaying the second-accept user interface element on the first user interface.

Item 12. Method according to any of items 1-11, wherein the first primary test parameter is a gain selected in the audible range of a user.

Item 13. Method according to any of items 1-12, wherein the act of obtaining one or more first test parameters including a first primary test parameter comprises obtaining a first secondary test parameter, and the method comprising:
displaying a second user interface comprising a first secondary user interface element according to the first secondary test parameter;
outputting a first secondary test signal according to the first secondary test parameter;
while displaying the second user interface, detecting a first user input indicative of a request for change in the first secondary test signal;
determining a second secondary test parameter according to the first user input indicative of a request for change in the first secondary test signal;
updating and displaying the second user interface according to the second secondary test parameter; and
output a second secondary test signal according to the second secondary test parameter.

Item 14. Electronic device comprising a display, an interface, and a processor, wherein the processor is configured to:
obtain one or more first test parameters including a first primary test parameter;
display a first user interface comprising a first primary user interface element according to the first primary test parameter;
output a first primary test signal according to the first primary test parameter;
detect a first user input indicative of a request for change in the first primary test signal, while displaying the first user interface;
determine a second primary test parameter according to the first user input;
update and display the first user interface according to the second primary test parameter; and
outputting a second primary test signal according to the second primary test parameter.

Item 15. A computer readable storage medium storing one or more programs, the one or more programs comprising instructions, which when executed by an electronic device with an interface, a memory and a processor cause the electronic device to perform the method of any one of items 1-13.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-4 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1 hearing test setup
2 electronic device
4 hearing device
6 display of electronic device
7 touch-sensitive display
8 first user interface
10 slider control
10A minimum of slider control
10B maximum of slider control
12 first primary user interface element
14 primary test signal
14A first primary test signal
14B second primary test signal
16 primary control parameter(s)
16A first primary control parameter(s)
16B second primary control parameter(s)
18 first button
20 second button
22 increase user interface element
24 decrease user interface element
26 increase-direction
28 decrease-direction
30 first-accept-input user interface element
32 first context user interface element
40 transceiver module
42 antenna
44 transceiver
46 input module
48 first input signal
50 first microphone
50A first microphone input signal
52 second microphone
52A second microphone input signal
54 beamforming module
56 processor
58 electrical output signal
60 receiver
100 method S2 obtaining one or more first test parameters (TP_1) including a first primary test parameter (TP_1_1)
S4 displaying a first user interface (UI_1)
S6 outputting a first primary test signal (TS_1_1)
S8 detecting a first user input (UIP_1) indicative of a request for change in TP_1_1
S10 determining a second primary test parameter (TP_2_1)
S12 updating and displaying the UI_1
S14 outputting a second primary test signal (TS_2_1)
S16 detecting a second user input (UI_2) indicative of a request for change in TS_2_1
S18 determining a third primary test parameter (TP_3_1)
S20 updating and displaying the first user interface according to TP_3_1
S22 outputting a third primary test signal (TS_3_1)
S24 detecting a user input indicative of acceptance of TS_1_1
S26 determining and outputting a primary operating parameter (POP)
S28 transmitting the POP
S30 detecting a first user-accept input (UAIP_1)
S32 determining a first user-accept user interface element (UAUIE_1)
S34 displaying UAUIE_1
S36 detecting a second user-accept input (UAIP_2)
S38 determining a second user-accept user interface element (UAUIE_2)
S40 displaying UAUIE_2
S42 obtaining a first secondary test parameter (TP_1_2)
S44 displaying a second user interface (UI_2)
S46 outputting a first secondary test signal (TS_1_2)
S48 detecting a first user input (UIP_2) indicative of a request for change in TS_1_2
S50 determining a second secondary test parameter (TP_2_2)
S52 updating and displaying UI_2
S54 outputting a second secondary test signal (TS_2_2)

The invention claimed is:

1. A method of providing a hearing test for a user, the method comprising:
obtaining one or more first test parameters including a first primary test parameter;
providing a first user interface comprising a first primary user interface element associated with the first primary test parameter;
providing instruction instructing the user to adjust a test signal volume until it is minimally perceivable by the user;
outputting a first primary test signal for a first frequency based on the first primary test parameter;
obtaining a first user input indicative of a request to change the first primary test signal; and
outputting a second primary test signal for the first frequency based on the first user input;
wherein the first primary user interface element is a slider control, and wherein the method further comprises adjusting a resolution of the slider control.

2. The method according to claim 1, further comprising:
detecting a second user input indicative of a request to change the second primary test signal;
determining a third primary test parameter based on the second user input; and
outputting a third primary test signal based on the third primary test parameter.

3. The method according to claim 1, wherein the first user interface comprises a slider control.

4. The method according to claim 1, further comprising:
obtaining an other user input indicative of an acceptable test signal; and
outputting an operating parameter for a hearing device after the other user input indicative of the acceptable test signal is obtained.

5. The method according to claim 4, wherein the act of outputting the operating parameter for the hearing device comprises transmitting the operating parameter to the hearing device.

6. The method according to claim 4, wherein the other user input indicative of the acceptable test signal comprises a first user-accept input associated with a first user-accept primary test parameter.

7. The method according to claim 6, wherein the operating parameter for the hearing device is based on the first user-accept primary test parameter.

8. The method according to claim 1, further comprising:
obtaining an other user input indicative of an acceptable test signal for the first frequency:
providing an other user interface element after the other user input indicative of the acceptable test signal for the first frequency is obtained.

9. The method according to claim 4, wherein the acceptable test signal comprises the first primary test signal, the second primary test signal, or another primary test signal.

10. The method according to claim 1, wherein the first primary test parameter is a gain in an audible range of the user.

11. The method according to claim 1, further comprising displaying the provided first user interface.

12. The method according to claim 1, wherein the second primary test signal is outputted as a changed first primary test signal.

13. The method of claim 1, wherein the second primary test signal is associated with a second primary test parameter PTP_2, and wherein the second primary test parameter PTP_2 is based on the first primary test parameter PTP_1 and a change parameter CP_1.

14. The method of claim 13, wherein the second primary test parameter PTP_2 is equal to the first primary test parameter PTP_1 plus the change parameter CP_1.

15. The method of claim 1, further comprising providing buttons, wherein the slider control and the buttons are alternative controls for adjusting the test signal volume.

16. The method of claim 1, wherein the resolution of the slider is adjusted based on a second primary test parameter and/or the first user input.

17. The method of claim 1, wherein the first primary test parameter indicates a first level of the test signal volume.

18. The method of claim 17, wherein the test signal volume of the first primary test signal is at the first level.

19. A computer readable non-transitory medium storing instructions, which when executed by an electronic device, will cause the electronic device to perform the method of claim 1.

20. An electronic device comprising a display, an interface, and a processing unit, wherein the electronic device is configured to:
obtain one or more first test parameters including a first primary test parameter;
provide a first user interface comprising a first primary user interface element associated with the first primary test parameter;
provide instruction instructing the user to adjust a test signal volume until it is minimally perceivable by the user;
output a first primary test signal for a first frequency based on the first primary test parameter;
obtain a first user input indicative of a request to change the first primary test signal; and
output a second primary test signal for the first frequency based on the first user input;
wherein the first primary user interface element is a slider control, and wherein the electronic device is configured to adjust a resolution of the slider control.

* * * * *